UNITED STATES PATENT OFFICE.

LOUIS ANTOINE RITTERBANDT, OF SOHO, ENGLAND.

IMPROVEMENT IN REMOVING AND PREVENTING INCRUSTATION OF STEAM-BOILERS.

Specification forming part of Letters Patent No. 4,189, dated September 11, 1845.

*To all whom it may concern:*

Be it known that I, LOUIS ANTOINE RITTERBANDT, of Wloclawek, Poland, now residing at Gerard Street, Soho, in the county of Middlesex and Kingdom of Great Britain, doctor of medicine, have invented Improvements in Preventing and Removing Incrustation in Steam-Boilers and Steam-Generators; and I do hereby declare that the following is a full and exact description.

The incrustation of steam-boilers and steam-generators, when fresh water is used, arises chiefly from the heat employed to generate steam, causing the lime which exists in the water, in the form of a soluble bicarbonate of lime, to be converted into an insoluble carbonate of lime, the particles of which, as they fall toward the bottom, carry down with them masses of other insoluble matters which may be floating in the water; and when salt or sea water is employed, as in marine boilers, incrustation is generally promoted by the carbonate of lime set free by the heat, which, as it floats in the water previous to subsidence, forms nuclei for the accrescence of other matter and disposes the saline compounds—such as the sulphate of magnesia, chloride of sodium, &c—to crystallize and precipitate much sooner than they otherwise would.

Now, the nature of my invention consists, in the former case, either in preventing the formation of carbonate of lime, or in converting it when formed, into a soluble salt; and in the latter, in retarding the formation of the saline crystals, and thereby also retarding the precipitation of other floating matters which would produce incrustation. Thus in both cases the waste of heat and destruction of the metal ordinarily arising from incrustation, and from the frequent blowing off, which is had recourse to, is in great measure obviated. The manner in which I effect those objects I will now proceed to explain.

Although when lime exists in the state of a bicarbonate it is perfectly soluble, but easily converted by heat into an insoluble carbonate, and so precipitated, yet there are other salts or forms of lime which remain in solution as long as the water is not over-saturated with them, and remains in a heated state. Among these soluble salts are the hydrochlorate or muriate of lime, or, as it is sometimes also called, the "chloride of calcium;" also, the acetate of lime and the nitrate of lime. By converting, therefore, the insoluble carbonate of lime either into a muriate or acetate or nitrate or other soluble salt of lime, it assumes a condition in which it is not precipitated by the heat, and neither incrusts the boiler itself nor contributes to its incrustation by promoting the crystallization or precipitation of other matters. To effect this conversion I introduce into the water in the steam-boiler or steam-generator, or into the supply-tank connected with it, some ammoniacal salt, the acid of which, uniting with lime as a base, will form a perfectly soluble salt of lime not decomposed or separated by heat. The ammoniacal salt thus to be employed may be either the muriate of ammonia (called sometimes the "hydrochlorate of ammonia," also "chloride of ammonium," and commonly known by the name of "sal ammoniac,") or the "acetate of ammonia," or the "nitrate of ammonia," or any other ammoniacal salt whose acid forms with lime a soluble compound. I prefer the muriate of ammonia because of its cheapness, it being easily obtained from various animal and mineral substances existing in great abundance. It is not necessary to employ this salt in a state of purity, the inferior crystals before purification and sublimation serving sufficiently well the purpose of my invention.

The quantity of the ammoniacal salt to be employed will depend on the quantity of lime contained in the water in the form of bicarbonate. This can be readily ascertained by chemical analysis; and I would recommend the following plan for the purpose, as from its simplicity it can be practiced by any working engineer: Take a gallon or any other measure of the water to be examined and evaporate it slowly in an open vessel. Collect the solid matter left at the bottom of the vessel and weigh it carefully. Then add to it, in a glass vessel, a mixture of equal parts of muriactic acid and distilled or rain water, and let it remain during fifteen minutes. Next, filter through white filtering or blotting paper, or strain through clean linen or calico. Collect the solid matter left in the filter and dry it. The difference between its weight now and before will give the amount of carbonate of lime dissolved in the muriatic acid. Thus, if a gallon of water gives ten grains of solid matter, and after digesting with muriatic acid there are only six grains left, the gallon contains four grains of carbonate of lime. Having thus determined the quantity of lime in a gallon of water, I would recommend the muriate of ammonia to be used in the same quantity, or rather a little in excess, as at the rate of fifty-four of this ammoniacal salt to fifty of the carbonate of lime.

If the acetate of ammonia be employed for the purpose of my invention, the proportions must be about forty parts of the saturated solution to about fifteen parts of carbonate of lime. What I mean by saturated solution is one prepared by adding carbonate of ammonia to acetic or pyroligneous acid or to distilled vinegar until no more is dissolved. If nitrate of ammonia be employed, the proportions must be eighty parts of the crystals to fifty parts of carbonate of lime. Of course, in every case the amount of water evaporated in a given time must be taken into account, as in proportion to the water evaporated will be the carbonate of lime set free and the quantity of the ammoniacal salt required. The action of the muriate of ammonia (which, for the reason before given, I prefer) is partly chemical and partly mechanical. First, it is chemical, inasmuch as after the introduction of the salt into the water a double decomposition takes place. The muriatic acid combines by elective affinity with the lime to form muriate of lime, while the carbonic acid passes to the ammonia and forms carbonate of ammonia, the former or the muriate of lime, remaining in a state of solution, and the latter, or the carbonate of ammonia, volatilizing under the influence of the heat and passing off along with the steam. This decomposition, however, goes on slowly and gradually. When the salt is added in considerable quantities at a time, it remains in part in the state of a muriate of ammonia until fresh supplies of water containing additional quantities of carbonate of lime to be decomposed are introduced. In practice, therefore, it will be found of great advantage so to use the muriate of ammonia—that is, to add it to the water in considerable quantities at a time, since in this way one application may suffice for several days or even weeks. This, however, will depend on the quantity of carbonate of lime in the water and the rate of evaporation. The mechanical action of this salt, as also of the acetate or nitrate, or other salts of ammonia, as before stated, consists in its increasing the density of the water without, however, affecting its clearness, and thus assisting to retain in a state of suspension any foreign matter which would otherwise sink to the bottom and there form a solid incrustation.

In case of fixed boilers the salt is conveniently supplied through the man-hole or injected in a state of solution. In locomotive-boilers the material may be placed in the tank, and must be renewed according to the amount of water evaporated per diem and the lime present in the water.

When it is required to free steam-boilers or steam-generators from old incrustation, I use the muriate of ammonia, or any of the ammoniacal salts whose acids will, with lime as a base, form soluble compounds, in much larger quantities—say double or even treble the proportion described—when the salt is employed for preventing only; and when the old incrustation is difficult to remove by these means, and does not yield readily to them, besides the ordinary proportion of ammoniacal salt before described, I pour once a week into the boiler or supply-tank, which has been previously filled with water, a quantity of muriatic or nitric acid; but I prefer the former, in the proportion of one pint to one hundred gallons of water; or, if the acetic acid be used, in the proportion of one quart to one hundred gallons of water; or, if common vinegar be employed, in the proportion of one gallon to one hundred gallons of water, renewing the operation once a week until the incrustation is removed. When these ingredients are introduced into the boiler, it is advisable that the engine should be off work.

Having now described the nature of my said invention, and in what manner the same is to be performed, I declare that what I claim is—

1. The application of ammoniacal salts, in the manner before described, to prevent and remove incrustation in steam-boilers and steam-generators.

2. The use of ammoniacal salts, in conjunction with muriatic, acetic, or nitric acid, for the purpose of removing old incrustation, in the manner above described.

L. A. RITTERBANDT.

Witnesses:
R. A. BROOMAN,
*Patent Agent,* 166 *Fleet Street, London.*
J. BOUNSALL,
*Clerk to Messrs. Robertson & Co.,* 166 *Fleet Street, London.*